(12) United States Patent
Yu

(10) Patent No.: US 9,338,516 B2
(45) Date of Patent: May 10, 2016

(54) ELECTRONIC DEVICE AND METHOD FOR TRANSFERRING DATA VIA DIGITAL TELEVISION NETWORK AND MOBILE COMMUNICATION NETWORK USING THE ELECTRONIC DEVICE

(71) Applicant: Chi Mei Communication Systems, Inc., New Taipei (TW)

(72) Inventor: Pin-Shen Yu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 466 days.

(21) Appl. No.: 13/778,141

(22) Filed: Feb. 27, 2013

(65) Prior Publication Data

US 2013/0291026 A1   Oct. 31, 2013

(51) Int. Cl.
*H04W 36/30* (2009.01)
*H04W 40/12* (2009.01)
*H04W 52/02* (2009.01)
*H04B 7/08* (2006.01)
*H04B 17/318* (2015.01)
*H04N 21/61* (2011.01)
*H04L 12/26* (2006.01)
*H04N 21/442* (2011.01)
*H04N 21/462* (2011.01)

(52) U.S. Cl.
CPC .............. *H04N 21/6131* (2013.01); *H04B 7/08* (2013.01); *H04B 17/318* (2015.01); *H04L 43/16* (2013.01); *H04N 21/44209* (2013.01); *H04N 21/4622* (2013.01); *H04N 21/6112* (2013.01); *H04W 36/30* (2013.01); *H04W 40/12* (2013.01); *H04W 52/0245* (2013.01)

(58) Field of Classification Search
CPC .............. H04B 7/0814; H04B 17/318; H04N 21/6131; H04N 21/6162; H04N 19/166; H04W 36/30; H04W 40/12; H04W 52/0245; H04L 43/16
See application file for complete search history.

(56) References Cited

U.S. PATENT DOCUMENTS

| | | | | |
|---|---|---|---|---|
| 5,870,666 | A * | 2/1999 | Tanaka .................. | H04B 17/318 455/226.1 |
| 7,600,690 | B1 * | 10/2009 | Gailloux ................. | H04L 67/18 235/462.45 |
| 2011/0099487 | A1 * | 4/2011 | Pyhalammi et al. .......... | 715/762 |
| 2011/0149753 | A1 * | 6/2011 | Bapst et al. .................... | 370/252 |

* cited by examiner

*Primary Examiner* — Benjamin R Bruckart
*Assistant Examiner* — Jason Thomas
(74) *Attorney, Agent, or Firm* — Novak Druce Connolly Bove + Quigg LLP

(57) ABSTRACT

In a method for transferring data via a digital television (DTV) network and a mobile communication network using an electronic device, the method receives a DTV signal via the DTV network and detects a decode error rate (DER) of the DTV signal at a first frequency. The method further detects the DER of the DTV signal at a second frequency and detects an average signal strength of the mobile communication network when the DER is continuously greater than a first threshold value. The method builds an electronic connection between the electronic device and a multimedia server via the mobile communication network and receives multimedia data from the multimedia server when the DER is continuously greater than a second threshold value and when the average signal strength is continuously greater than a third threshold value.

15 Claims, 3 Drawing Sheets

ELECTRONIC DEVICE AND METHOD FOR TRANSFERRING DATA VIA DIGITAL TELEVISION NETWORK AND MOBILE COMMUNICATION NETWORK USING THE ELECTRONIC DEVICE

BACKGROUND

1. Technical Field

The present disclosure is related to electronic devices and data transfer methods, especially related to an electronic device and a method for transferring data via a digital television network and a mobile communication network using the electronic device.

2. Description of Related Art

Many electronic devices, such as a mobile phone or a multimedia player, for example, can receive digital television (DTV) signals to broadcast a DTV program. Users may watch the DTV program using the electronic devices when the DTV signals are received in an outdoor situation or a moving situation. A DTV base station is mostly located in a crowded area to cover a population of a town and a city. Coverage rate of the DTV signals is not high in a suburban area. The electronic devices may receive multimedia data synchronous with the DTV signals by using a data transfer service of a mobile communication network. The users may watch the DTV program using the electronic devices according to the multimedia data. To transfer data via a DTV network and the mobile communication network for obtaining a better watching quality is the most important thing that is needed to be solved.

Therefore, there is room for improvement within the prior art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 1:
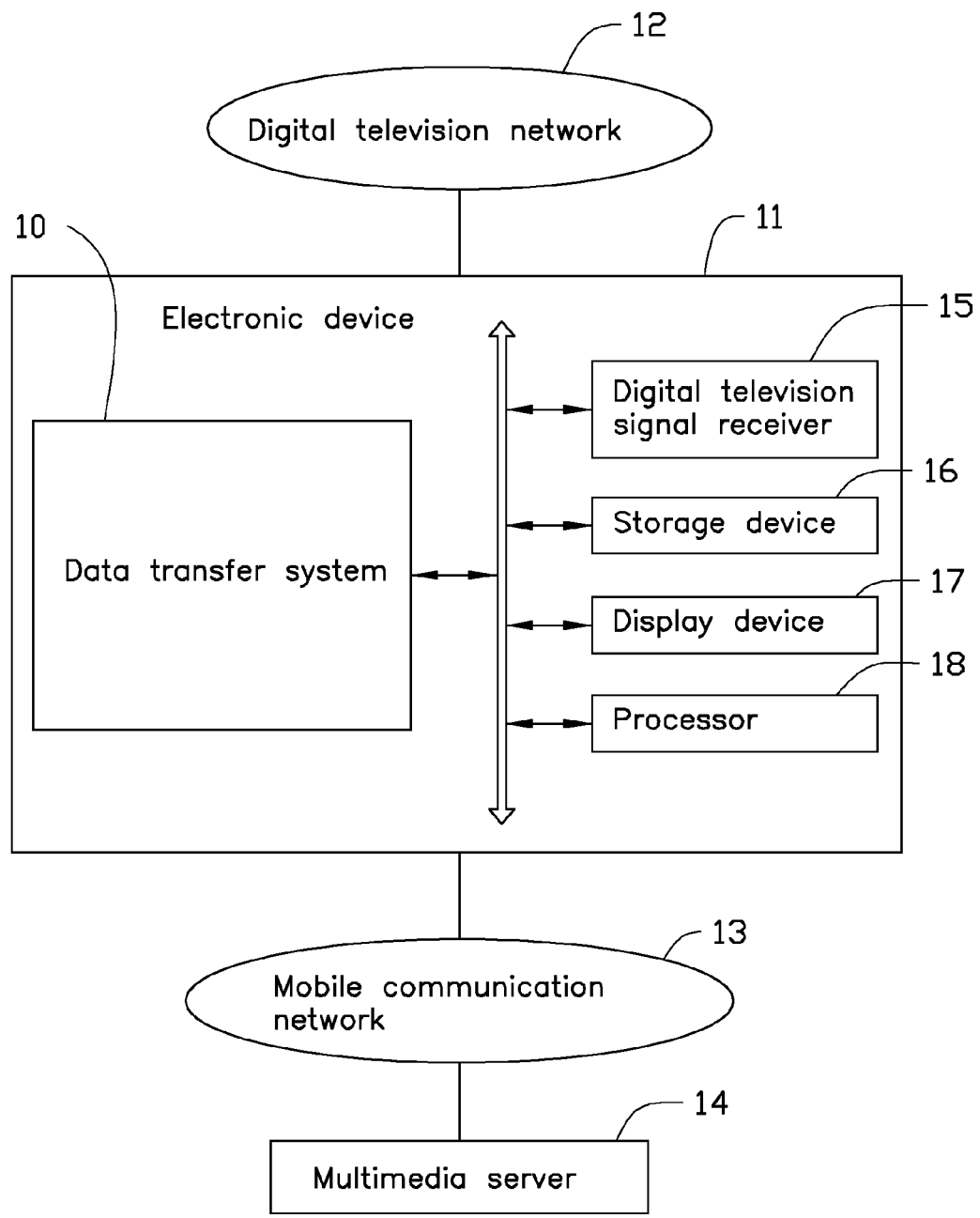
FIG. 1 is a schematic diagram of one embodiment of an electronic device for transferring data via a digital television network and a mobile communication network.

FIG. 1 is a schematic diagram of one embodiment of an electronic device 11 for transferring data via a digital television (DTV) network 12 and a mobile communication network 13. In the embodiment, the electronic device 11 includes a data transfer system 10 and transfers data via the DTV network and the mobile communication network. The electronic device 11 is connected to the DTV network 12 and the mobile communication network 13. The DTV network 12 transmits DTV signals to the electronic device 11. The mobile communication network 13 is connected to a multimedia server 14, and the multimedia server 14 provides multimedia data which is synchronous with the DTV signal. The electronic device 11 includes a DTV signal receiver 15, a storage device 16, a display device 17, and a processor 18. The DTV signal receiver 15 receives the DTV signal from the DTV network 12 and from the multimedia server 14. The storage device 16 saves computerize program code of the data transfer system 10 and data which is needed when the data transfer system 10 is operating. The display device 17 displays a DTV program broadcasted by the DTV signal or the multimedia data. The processor 18 executes the computerize program code to transfer data via the DTV network 12 and the mobile communication network 13. The electronic device 11 may be a mobile phone, a multimedia player, or the other device which has a function of mobile communication and a function of multimedia displaying.

Figure 2:
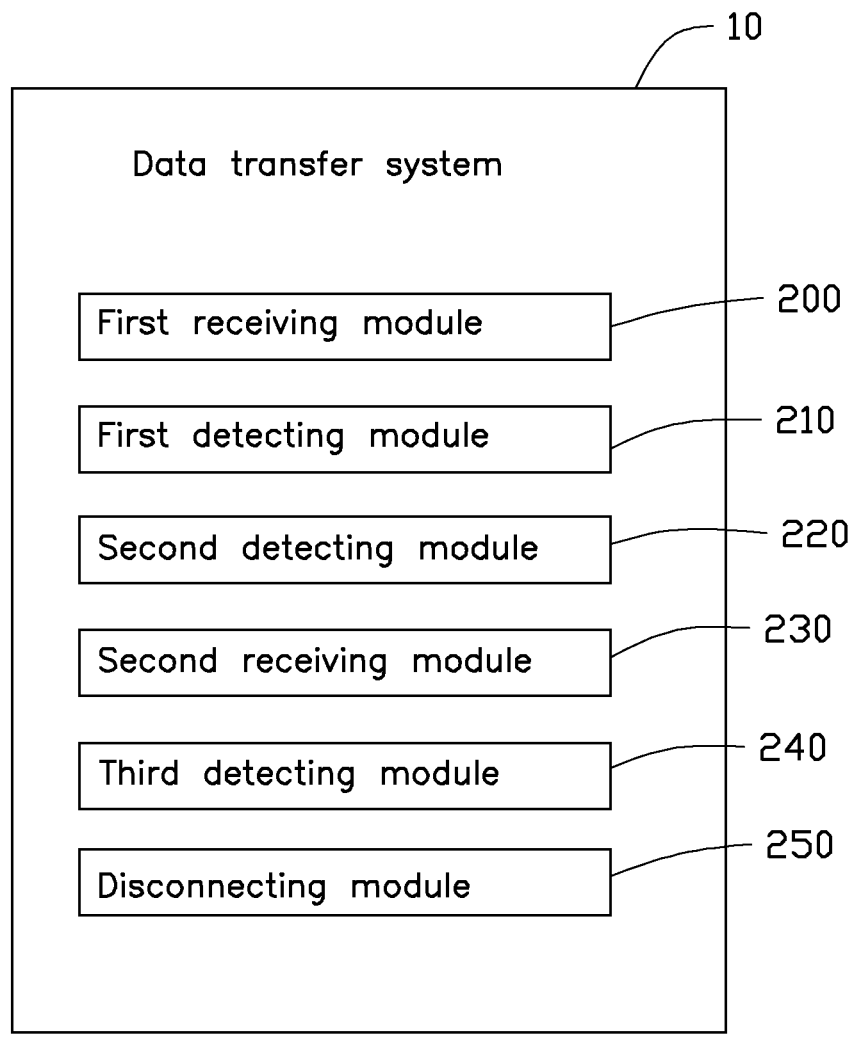
FIG. 2 is a block diagram of functional modules of a data transfer system of the electronic device of FIG. 1.

FIG. 2 is a block diagram of functional modules of the data transfer system 10 of the electronic device 11 of FIG. 1. The data transfer system 10 includes a first receiving module 200, a first detecting module 210, a second detecting module 220, a second receiving module 230, a third detecting module 240, and a disconnecting module 250, which the modules 210-250 include the computerized program code, which are executed by the processor 18.

The first receiving module 200 receives the DTV signals from the DTV network 12 by the DTV signal receiver 15, and broadcasts a DTV program according to the DTV signals on the display device 17 of the electronic device 11 when the DTV signal is received.

The first detecting module 210 detects a decode error rate (DER) of the DTV signal at a first frequency. In the embodiment, the first frequency is once every minute. The first detecting module 210 determines whether the DER of the DTV signal detected at the first frequency is continuously greater than a first threshold value, three times in succession, for example. In the embodiment, the first threshold value is twenty percent.

The second detecting module 220 detects the DER of the DTV signal at a second frequency when the DER of the DTV signal detected at the first frequency is continuously greater than the first threshold value. In addition, the second detecting module 220 determines whether the DER of the DTV signal detected at the second frequency is continuously greater than a second threshold value, four times in succession, for example. The second detecting module 220 further detects an average signal strength of the mobile communication network 13, and determines whether the average signal strength of the mobile communication network 13 is continuously greater than a third threshold value, four times in succession, for example. In the embodiment, the second frequency is greater than the first frequency, once every thirty-seconds, for example. The second threshold value is greater than the first threshold value. In the embodiment, the second threshold value is fifty percent and the third threshold value is minus ninety-five dbm. In the embodiment, the second detecting module 220 simultaneously detects the DER of the DTV signal and the average signal strength of the mobile communication network 13 at the second frequency to shorten a time for detecting. In the other embodiment, the second detecting module 220 may detect the DER of the DTV signal at the second frequency. When the DER of the DTV signal detected at the second frequency is continuously greater than the second threshold, the second detecting module 220 detects the average signal strength of the mobile communication network 13 detected at the second frequency or the other frequency.

The second receiving module 230 builds an electronic connection between the electronic device 11 and the multimedia server 14 via the mobile communication network 13. If the DER of the DTV signal detected at the second frequency is continuously greater than the second threshold value, and when the average signal strength of the mobile communication network 13 is continuously greater than the third threshold value. The second receiving module 230 further receives related data of the DTV program according to the DTV signal, and receives multimedia data from the multimedia server 14 according to the related data of the DTV program. The second receiving module 230 further broadcasts the DTV program on the display device 17 of the electronic device 11 according to the multimedia data. The related data of the DTV program indicates that users watch which channel of the DTV program.

The third detecting module 240 detects the DER of the DTV signal at a third frequency and detects the average signal strength of the mobile communication network 13. In the embodiment, the third frequency is equal to the second frequency, once every thirty-second, for example. The third detecting module 240 further determines whether the DER of the DTV signal detected at the third frequency is continuously less than a fourth threshold value, four times in succession, for example. The third detecting module 240 determines the average signal strength of the mobile communication network 13 is continuously less than a fifth threshold value. In the embodiment, the fourth threshold value is twenty percent which is equal to the first threshold value and the fifth threshold value is minus ninety-eight dbm.

The disconnecting module 250 disconnects the electronic connection between the electronic device 11 and the multimedia server 14 when the DER of the DTV signal detected eat the third frequency is continuously less than the fourth threshold value and when the average signal strength of the mobile communication network 13 is continuously less than the fifth threshold value. The DTV signal is received again by using the DTV signal receiver 15 and the DTV program is broadcasted on the display device 17 of the electronic device 11 according to the DTV signal.

Figure 3:
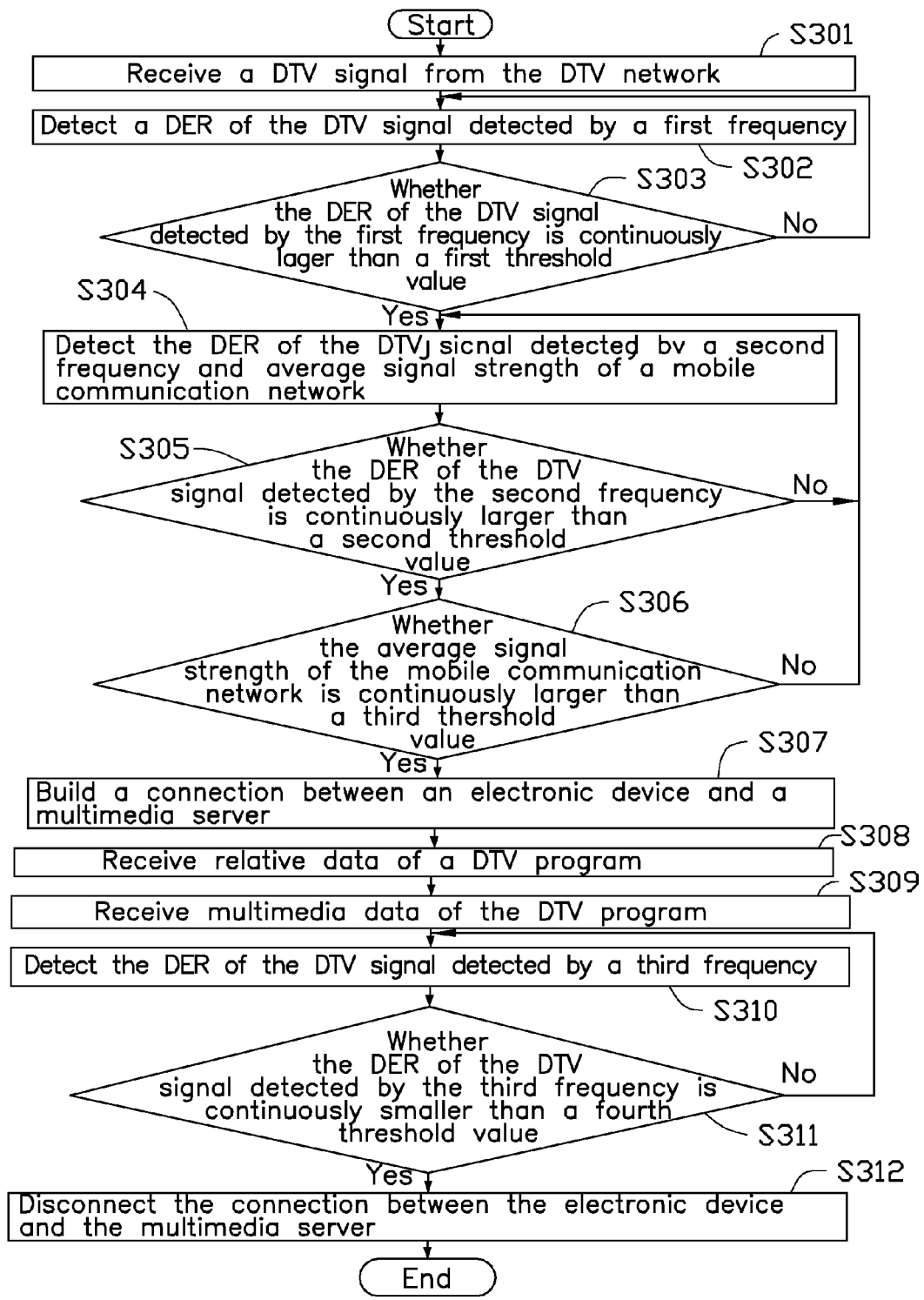
FIG. 3 is a flowchart of one embodiment of a method for transferring data via a digital television network and a mobile communication network using the electronic device of FIG. 1.

FIG. 3 is a flowchart of one embodiment of a method for transferring data via the digital television network 12 and the mobile communication network 13 using the electronic device 11 of FIG. 1.

In step S301, the first receiving module 200 receives a DTV signal from the DTV network 12 by the DTV signal receiver 15 and broadcasts a DTV program on the display device 17 of the electronic device 11 according to the DTV signal, and then step S302 is implemented.

In step S302, the first detecting module 210 detects a DER of the DTV signal detected at a first frequency. In the embodiment, the first frequency is once every minute, and then step S303 is implemented.

In step S303, the first detecting module 210 determines whether the DER of the DTV signal detected at the first frequency is continuously greater than a first threshold value, three times in succession, for example. In the embodiment, the first threshold value is twenty percent. If the DER of the DTV signal detected at the first frequency is not continuously greater than the first threshold value, then step S302 is implemented.

If the DER of the DTV signal detected at the first frequency is continuously greater than the first threshold value, then step S304 is implemented. In step S304, the second detecting module 220 simultaneously detects the DER of the DTV signal at a second frequency and an average signal strength of the mobile communication network 13, and then step S305 is implemented. In the embodiment, the second frequency is once every thirty-second.

In step S305, the second detecting module 220 determines whether the DER of the DTV signal detected at the second frequency is continuously greater than a second threshold value, four times in succession, for example. In the embodiment, the second threshold value is fifty percent. If the DER of the DTV signal detected at the second frequency is not continuously greater than the second threshold value, then step S304 is implemented.

If the DER of the DTV signal detected at the second frequency is continuously greater than the second threshold value, then step S306 is implemented. In step S306, the second detecting module 220 determines whether the average signal strength of the mobile communication network 13 is continuously greater than a third threshold value, four times in succession, for example. In the embodiment, the third threshold value is minus ninety-five dbm. If the average signal strength of the mobile communication network 13 is not continuously greater than the third threshold value, then step S304 is implemented.

If the average signal strength of the mobile communication network 13 is continuously greater than the third threshold value, then step S307 is implemented. In step S307, the second receiving module 230 builds an electronic connection between the electronic device 11 and the multimedia server 14 via the mobile communication network 13, and then step S308 is implemented.

In step S308, the second receiving module 230 receives related data of the DTV program according to the DTV signal, which is received, and then step S309 is implemented. The related data of the DTV program indicates that the users watch which channel of the DTV program.

In step S309, the second receiving module 230 receives multimedia data from the multimedia server 14 according to the related data of the DTV program, and broadcasts the DTV program on the display device 17 according to the multimedia data, and then step S310 is implemented.

In step S310, the third detecting module 240 detects the DER of the DTV signal detected at a third frequency, and then step S311 is implemented. In the embodiment, the third frequency is once every thirty-second.

In step S311, the third detecting module 240 determines whether the DER of the DTV signal detected at the third frequency is continuously less than a fourth threshold value, four times in succession, for example. In the embodiment, the fourth threshold value is twenty percent. If the DER of the DTV signal detected at the third frequency is not continuously less than the fourth threshold value, then step S310 is implemented.

If the DER of the DTV signal detected at the third frequency is continuously less than the fourth threshold value, then step S312 is implemented. In step S312, the disconnecting module 250 disconnects the electronic connection between the electronic device 11 and the multimedia server 14. The disconnecting module 250 receives the DTV signal again by using the DTV signal receiver 15, and broadcasts the DTV program on the display device 17 according to the DTV signal.

In the embodiment of FIG. 3, the second detecting module 220 determines whether the DER of the DTV signal detected at the second frequency is continuously greater than the second threshold value (step S305). If the DER of the DTV signal detected at the second frequency is not continuously greater than the second threshold value, then step S304 is implemented. If the DER of the DTV signal detected at the second frequency is continuously greater than the second threshold value, the second detecting module 220 continuously detects the DER of the DTV signal detected at the second frequency and the average signal strength of the mobile communication network 13. In other embodiments, if the DER of the DTV signal detected at the second frequency is not continuously greater than the second threshold value, the second detecting module 220 may further determine whether the DER of the DTV signal detected at the second frequency is continuously less than the first threshold value, four times in succession, for example. If the DER of the DTV signal detected at the second frequency is continuously less than the first threshold value, then step S302 is implemented. Otherwise, if the DER of the DTV signal detected at the second frequency is not continuously less than the first threshold value, then step S304 is implemented.

The third detecting module 240 detects the DER of the DTV signal at the third frequency (step S310). The disconnecting module 250 disconnects the electronic connection between the electronic device 11 and the multimedia server 14 when the DER of the DTV signal detected at the third frequency is continuously less than the fourth threshold value. The disconnecting module 250 receives the DTV signal again by using the DTV signal receiver 15. In another embodiment, the third detecting module 240 may not detect the DER of the DTV signal, but detect the average signal strength of the mobile communication network 13. The disconnecting module 250 disconnects the electronic connection between the electronic device 11 and the multimedia server 14 when the average signal strength of the mobile communication network is continuously less than the fifth threshold value. The disconnecting module 250 receives the DTV signal again by using the DTV signal receiver 15. In other embodiments, the third detecting module 240 detects the DER of the DTV signal at the third frequency and detects the average signal strength of the mobile communication network 13. The disconnecting module 250 disconnects the electronic connection between the electronic device 11 and the multimedia server 14 when the DER of the DTV signal detected at the third frequency is continuously less than the fourth threshold value and the average signal strength of the mobile communication network is continuously less than the fifth threshold value. The disconnecting module 250 receives the DTV signal again by using the DTV signal receiver 15.

In the embodiment, the DTV signal is detected at a low frequency (the first frequency). When the DTV signal detected at the low frequency is weak, the DTV signal and the signal of the mobile communication network 13 are detected at a higher frequency (the second frequency). When the DTV signal detected at the higher frequency is continuously weak and the signal of the mobile communication network 13 is strong, the electronic connection between the electronic device 11 and the multimedia server 14 is connected, and the multimedia data is received from the multimedia server 14. In the embodiment, the DTV signal is received again from the DTV network 12 when the DTV signal is strong or the signal of the mobile communication network 13 is weak. The embodiment ensures that the electronic device 11 preferably receives the DTV signal from the DTV network 12 when the DTV network 12 is strong, and receives the DTV signal from the mobile communication network 13 only when the DTV network 12 is weak. Because the electronic device 11 receiving the DTV signal from the DTV network 12 is low power consumption and low prices, the embodiment simultaneously ensures a good quality of the DTV signal, low power consumption, and low prices.

Depending on the embodiment, certain of the steps described may be removed, other may be added, and the sequence of the steps may be altered. It is also to be understood that the description and the claims drawn to a method may include some indication in reference to certain steps. However, the indication used is only to be viewed for identifier purposes and not necessarily as a suggestion as to an order for the steps.

The present disclosure is submitted in conformity with patent law. The above disclosure is the preferred embodiment. Any one of ordinary skill in this field can modify and change the embodiment within the spirit of the present disclosure, and all such changes or modifications are deemed included in the scope of the following claims.

What is claimed is:

1. An electronic device, the electronic device being connected to a digital television (DTV) network and a mobile communication network, the electronic device comprising:
   a display device;
   a storage device;
   at least one processor; and
   one or more modules stored in the storage device and executed by the at least one processor, the one or more modules comprising:
   a first receiving module receiving a DTV signal from the DTV network using a DTV signal receiver of the electronic device, and broadcasting a DTV program on the display device of the electronic device according to the DTV signal received from the DTV network;
   a first detecting module detecting, at a first frequency, a decode error rate (DER) of the DTV signal;
   a second detecting module detecting, at a second frequency, the DER of the DTV signal, and detecting an average signal strength of the mobile communication network when the DER of the DTV signal detected at the first frequency is continuously greater than a first threshold value, wherein the second frequency is greater than the first frequency; and
   a second receiving module building an electronic connection between the electronic device and a multimedia server via the mobile communication network when the DER of the DTV signal detected at the second frequency is continuously greater than a second threshold value and when the average signal strength of the mobile communication network is continuously greater than a third threshold value, wherein the second receiving module obtains related data of the DTV program according to the DTV signal, receives multimedia data synchronous with the DTV signal output from the multimedia server according to the related data, and broadcasts the DTV program on the display device of the electronic device according to the multimedia data, wherein the related data of the DTV program indicates which channel of the DTV program is being watched.

2. The electronic device of claim 1, wherein the one or more modules further comprises:
   a third detecting module detecting the DER at a third frequency and detecting the average signal strength of the mobile communication network;
   a disconnecting module disconnecting the electronic connection between the electronic device and the multimedia server when the DER of the DTV signal detected at the third frequency is continuously less than a fourth threshold value and when the average signal strength of the mobile communication network is continuously less than a fifth threshold value, wherein the disconnecting module receives the DTV signal again from the DTV network, and broadcasts the DTV program according to the DTV signal output from the DTV network.

3. The electronic device of claim 1, wherein the second threshold value is greater than the first threshold value.

4. The electronic device of claim 1, wherein the second detecting module simultaneously detects, at the second frequency, the DER of the DTV signal and the average signal strength of the mobile communication network.

5. The electronic device of claim 1, wherein the second detecting module determines whether the DER of the DTV signal detected at the second frequency is continuously less than the first threshold value when the DER detected at the second frequency is not greater than the second threshold value.

6. A method for transferring data via a digital television (DTV) network and a mobile communication network using an electronic device, the method comprising:
receiving a DTV signal from the DTV network using a DTV signal receiver of the electronic device, and broadcasting a DTV program according to the DTV signal received from the DTV network;
detecting, at a first frequency, a decode error rate (DER) of the DTV signal;
detecting, at a second frequency, the DER of the DTV signal when the DER is continuously greater than a first threshold value, wherein the second frequency is greater than the first frequency;
detecting an average signal strength of the mobile communication network;
building an electronic connection between the electronic device and a multimedia server via the mobile communication network when the DER detected at the second frequency is continuously greater than a second threshold value and the average signal strength is continuously greater than a third threshold value;
obtaining related data of the DTV program according to the DTV signal output, wherein the related data of the DTV program indicates which channel of the DTV program is being watched;
receiving multimedia data synchronous with the DTV signal output from the multimedia server according to the related data of the DTV program; and
broadcasting the DTV program according to the multimedia data output from the multimedia server.

7. The method of claim 6, further comprising:
detecting the DER of the DTV signal at a third frequency;
detecting the average signal strength of the mobile communication network;
disconnecting the electronic connection between the electronic device and the multimedia server when the DER of the DTV signal detected at the third frequency is continuously less than a fourth threshold value and when the average signal strength of the mobile communication network is continuously less than a fifth threshold value;
receiving the DTV signal again from the DTV network; and
broadcasting the DTV program according to the DTV signal output from the DTV network.

8. The method of claim 6, wherein the second threshold value is greater than the first threshold value.

9. The method of claim 6, further comprising:
detecting, at the second frequency, the DER of the DTV signal received from the DTV network and simultaneously detecting the average signal strength of the mobile communication network.

10. The method of claim 6, further comprising:
determining whether the DER of the DTV signal detected at the second frequency is continuously less than the first threshold value when the DER of the DTV signal detected at the second frequency is not greater than the second threshold value.

11. A non-transitory computer-readable storage medium having stored thereon instructions that, when executed by at least one processor of an electronic device, causes the processor to perform a data transfer method of the electronic device, the data transfer method comprising:
receiving a digital television (DTV) signal from the DTV network using a DTV signal receiver of the electronic device, and broadcasting a DTV program according to the DTV signal received from the DTV network;
detecting a decode error rate (DER) of the DTV signal;
detecting, at a second frequency, the DER of the DTV signal when the DER is continuously greater than a first threshold value, wherein the second frequency is greater than the first frequency;
detecting an average signal strength of the mobile communication network;
building an electronic connection between the electronic device and a multimedia server via the mobile communication network when the DER detected at the second frequency is continuously greater than a second threshold value and the average signal strength is continuously greater than a third threshold value;
obtaining related data of the DTV program according to the DTV signal output, wherein the related data of the DTV program indicates which channel of the DTV program is being watched;
receiving multimedia data synchronous with the DTV signal output from the multimedia server according to the related data of the DTV program; and
broadcasting the DTV program according to the multimedia data output from the multimedia server.

12. The storage medium of claim 11, wherein the method further comprises:
detecting the DER of the DTV signal at a third frequency;
detecting the average signal strength of the mobile communication network;
disconnecting the electronic connection between the electronic device and the multimedia server when the DER of the DTV signal detected at the third frequency is continuously less than a fourth threshold value and when the average signal strength of the mobile communication network is continuously less than a fifth threshold value;
receiving the DTV signal again from the DTV network; and
broadcasting the DTV program according to the DTV signal output from the DTV network.

13. The storage medium of claim 11, wherein the second threshold value is greater than the first threshold value.

14. The storage medium of claim 11, wherein the method further comprises:
detecting, at the second frequency, the DER of the DTV signal received from the DTV network and simultaneously detecting the average signal strength of the mobile communication network.

15. The storage medium of claim 11, wherein the method further comprises:
  determining whether the DER of the DTV signal detected at the second frequency is continuously less than the first threshold value when the DER of the DTV signal detected at the second frequency is not greater than the second threshold value.

\* \* \* \* \*